United States Patent
Chen et al.

(10) Patent No.: US 9,442,524 B2
(45) Date of Patent: Sep. 13, 2016

(54) BRACELET-TYPE ELECTRONIC APPARATUS AND FRAME THEREOF

(71) Applicant: HTC Corporation, Taoyuan (TW)

(72) Inventors: Cheng-Yu Chen, Taoyuan (TW);
Zhao-Yin Chen, Taoyuan (TW);
Yen-Cheng Lin, Taoyuan (TW);
Chung-Chuan Chu, Taoyuan (TW);
Sheng-Chieh Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 25 days.

(21) Appl. No.: 14/597,206

(22) Filed: Jan. 14, 2015

(65) Prior Publication Data
US 2016/0202730 A1    Jul. 14, 2016

(51) Int. Cl.
*G06F 1/16* (2006.01)
*A44C 5/00* (2006.01)

(52) U.S. Cl.
CPC ............. *G06F 1/163* (2013.01); *A44C 5/0053* (2013.01); *G06F 1/1656* (2013.01)

(58) Field of Classification Search
CPC .... G06F 1/163; G06F 1/1656; G06F 1/1681; G06F 1/1683
USPC ........ 361/679.03, 749; 379/433.1; 63/3–15.7
See application file for complete search history.

(56) References Cited

U.S. PATENT DOCUMENTS

| 4,412,751 A * | 11/1983 | Jeannet | G04G 17/083 368/204 |
| 5,081,852 A * | 1/1992 | Cox | A44C 5/0084 63/3 |
| 5,605,059 A * | 2/1997 | Woodward | A44C 5/0084 63/15.7 |
| 6,212,414 B1 * | 4/2001 | Alameh | H04B 1/385 455/347 |
| 2003/0030595 A1 * | 2/2003 | Radley-Smith | A44C 5/0007 345/1.3 |
| 2013/0188322 A1 | 7/2013 | Lowe | |
| 2014/0334083 A1 * | 11/2014 | Bailey | G06F 1/163 361/679.03 |
| 2016/0048159 A1 * | 2/2016 | McCormack | G06F 1/163 361/679.03 |

FOREIGN PATENT DOCUMENTS

| CN | 201752263 U | 3/2011 |
| CN | 204014321 U | 12/2014 |

OTHER PUBLICATIONS

Corresponding Taiwanese Office Action that these art references were cited on Dec. 21, 2015.

* cited by examiner

*Primary Examiner* — Nidhi Thaker
(74) *Attorney, Agent, or Firm* — CKC & Partners Co., Ltd.

(57) ABSTRACT

A frame of a bracelet-type electronic apparatus includes a plurality of main frame bodies, at least one elastic member and at least one first stopping member. The main frame bodies are arranged to form an arc-shaped structure, and two main frame bodies adjacent to each other define an interval. The arc-shaped structure defines a wearing space. Each of the main frame bodies has an inner side, exposed in the wearing space. The elastic member is connected to two adjacent main frame bodies. The elastic member is disposed on the inner sides of the main frame bodies. The first stopping member is protruded from one main frame body toward another main frame body adjacent to each other.

14 Claims, 8 Drawing Sheets

BRACELET-TYPE ELECTRONIC APPARATUS AND FRAME THEREOF

BACKGROUND

1. Technical Field

Embodiments of the present invention relate to a bracelet-type electronic apparatus. More particularly, embodiments of the present invention relate to a bracelet-type electronic apparatus and the frame thereof.

2. Description of Related Art

In pace with rapid development of technology, wearable devices such as smart glasses, smart watches and smart bracelets have become popular. For example, smart bracelets typically have a wireless module and a processor disposed therein, and a touch display is disposed on the outer surface of the smart bracelet. As a result, the user can browse Internet by touching the touch display on the smart bracelet.

When the user tries wears the smart bracelet, the smart bracelet requires an outward bend, so that the smart bracelet can embrace the wrist. Although the frame of the smart bracelet is typically made of flexible plastic material, it is difficult to control the force for bending the frame, and therefore, a bent frame may be split, and may be even broken.

SUMMARY

Therefore, one aspect of the present invention prevents the frame of the bracelet from splitting and even broken.

In accordance with one embodiment of the present invention, a frame of a bracelet-type electronic apparatus includes a plurality of main frame bodies, at least one elastic member and at least one first stopping member. The main frame bodies form an arc-shaped structure. Two of the main frame bodies adjacent to each other define an interval. The arc-shaped structure defines a wearing space. Each of the main frame bodies has an inner side exposed in the wearing space. The elastic member is connected to two of the main frame bodies adjacent to each other. The elastic member is disposed on the inner sides of the main frame bodies. The first stopping member protrudes from one of the main frame bodies toward another of the main frame bodies adjacent to each other.

In accordance with another embodiment of the present invention, a bracelet-type electronic apparatus includes a flexible cover, a display device and a frame. The display device is disposed on the flexible cover. The frame is accommodated in the flexible cover. The frame includes a plurality of main frame bodies, at least one elastic member and at least one first stopping member. The main frame bodies form an arc-shaped structure. Two of the main frame bodies adjacent to each other define an interval. The arc-shaped structure defines a wearing space. Each of the main frame bodies has an inner side exposed in the wearing space. The elastic member is connected to two of the main frame bodies adjacent to each other. The elastic member is disposed on the inner sides of the main frame bodies. The first stopping member protrudes from one of the main frame bodies toward another of the main frame bodies adjacent to each other.

In the foregoing embodiments, because the frame includes the elastic member connected to two adjacent main frame bodies, the elastic member is bent inwardly to bear the bending force exerting to the main frame bodies when the frame is bent outwardly, so that the force exerting to the main frame bodies can be reduced, thereby preventing the frame from splitting or becoming broken.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
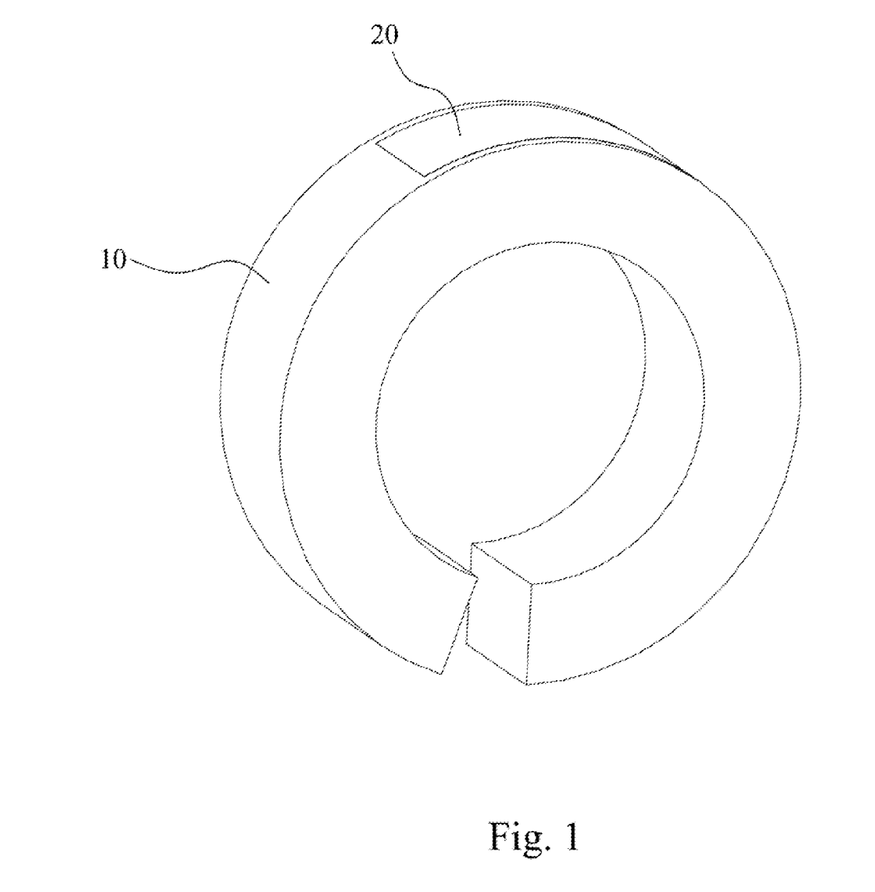
FIG. 1 is a perspective view of a bracelet-type electronic apparatus in accordance with one embodiment of the present invention.
Figure 2:
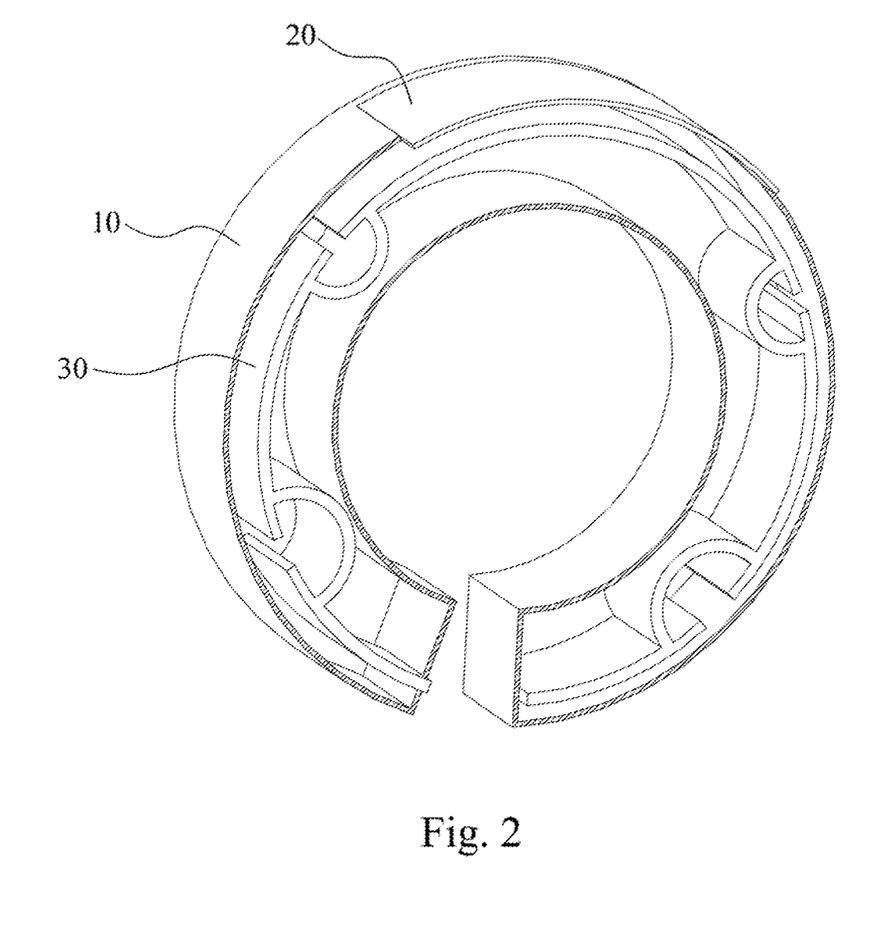
FIG. 2 is a perspective cross-sectional view of the bracelet-type electronic apparatus shown in FIG. 1.

FIG. 1 is a perspective view of a bracelet-type electronic apparatus in accordance with one embodiment of the present invention. FIG. 2 is a perspective cross-sectional view of the bracelet-type electronic apparatus shown in FIG. 1. As shown in FIGS. 1 and 2, in this embodiment, the bracelet-type electronic apparatus includes a flexible cover 10, a display device 20 and a frame 30. The display device 20 is disposed on the flexible cover 10 for displaying information. The frame 30 is accommodated in the flexible cover 10 for supporting the flexible cover 10, so as to keep the flexible cover 10 on a particular shape.

Figure 3:
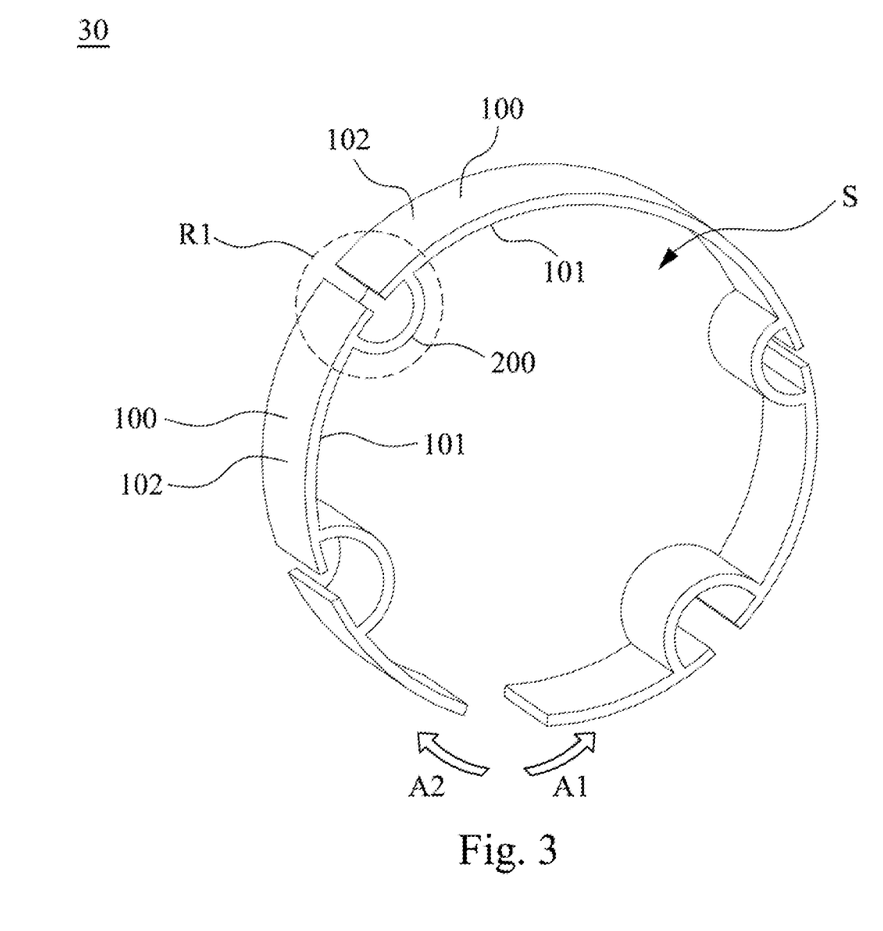
FIG. 3 is a perspective view of the frame shown in FIG. 2.

FIG. 3 is a perspective view of the frame 30 shown in FIG. 2. As shown in FIG. 3, the frame 30 includes a plurality of main frame bodies 100 and at least one elastic member 200. The main frame bodies 100 are arranged at intervals and form an arc-shaped structure. In other words, the main frame bodies 100 are arranged as the arc-shaped structure, and two main frame bodies 100 adjacent to each other define an interval. The arc-shaped structure defines a wearing space S, so that the user can wear the bracelet-type electronic apparatus. Each of the main frame bodies 100 has an inner side 101 and an outer side 102 opposite to the inner side 101. The inner side 101 is exposed in the wearing space S. In some embodiments, the main frame bodies 100 may be arranged at intervals as a C-shaped structure. The elastic member 200 is connected to two main frame bodies 100 adjacent to each other. The elastic member 200 is disposed on the inner sides 101 of the main frame bodies 100. When the user would like to wear the bracelet-type electronic apparatus, two spatially separated (not connected) main frame bodies 100 can be respectively bent along the directions A1 and A2. When the main frame bodies 100 are bent, the bending force exerts to the elastic member 200 and thereby bends the elastic member 200 inwardly, and therefore, the elastic member 200 bears at least a portion of the bending force exerting to the main frame bodies 100, thereby preventing the main frame bodies 100 from bearing undue bending force and preventing the frame 30 from splitting or becoming broken.

Figure 4:
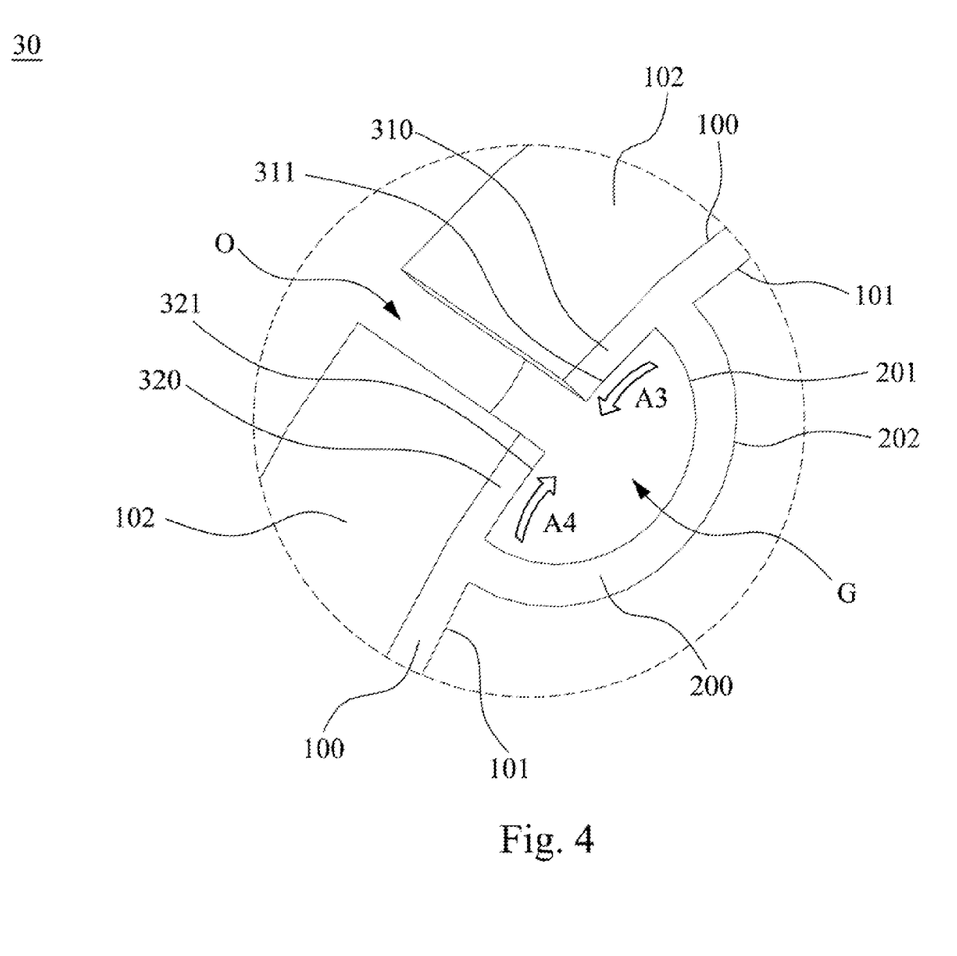
FIG. 4 is an enlarge view of the partial region R1 shown in FIG. 3.

More particularly, reference can be now made to FIG. 4, which is an enlarge view of the partial region R1 shown in FIG. 3. As shown in FIG. 4, the elastic member 200 is formed in a curved shape and defines a buffering space G, so as to allow the elastic member 200 to be bent. The buffering space G has an opening O. The opening O of the buffering space G is located between the main frame bodies 100. In other words, the elastic member 200 extends along a direction away from one main frame body 100 and is bent toward another main frame body 100, so as to make the opening O of the buffering space G located between the main frame bodies 100. By such a configuration, when the left main frame body 100 bears the force along the direction A4, the main frame body 100 deforms toward the opening O, so that the left part of the elastic member 200 is bent along the direction A4. In contrast, when the right main frame body 100 bears the force along the direction A3, the main frame body 100 deforms toward the opening O, so that the right part of the elastic member 200 is bent along the direction A3. As such, the elastic member 200 bears the force exerting to the main frame bodies 100 that is located on the opposite sides of the elastic member 200, so as to prevent the main frame body 100 from bearing undue force, thereby preventing the frame from splitting or becoming broken.

Further, because the elastic member 200 is elastic, when the user stops bending the bracelet-type electronic apparatus, the elastic member 200 can recover to the original shape by the elasticity, so that the main frame bodies 100 can move back to the original positions, thereby being arranged as the C-shaped structure, and embracing the wrist of the user. For example, the material of the elastic member 200 can be the plastic material having elasticity, so as to allow the elastic member 200 to recover its original shape.

In some embodiments, as shown in FIG. 4, the main frame body 100 is flexible. As a result, not only the elastic member 200 can be bent or deformed, the main frame body 100 can also be bent or deformed as well, so that the frame 30 can be deformed more significantly. In some embodiments, the main frame body 100 is elastic. As such, when the user stops bending the bracelet-type electronic device, the main frame body 100 can recover to the original shape. For example, the material of the main frame body 100 can be the plastic material having elasticity.

In some embodiments, as shown in FIG. 4, the frame 300 includes a first stopping member 310 and a second stopping member 320. The first stopping member 310 is protruded from one of the main frame bodies 100 (such as the right main frame body 100) toward another of the main frame bodies 100 (such as the left main frame body 100) adjacent to each other. The first stopping member 310 covers a portion of the opening O. The second stopping member 320 is protruded from said another of the main frame bodies 100 (such as the left main frame body 100) toward the main frame body 100 from which the first stopping member 310 is protruded (such as the right main frame body 100). The second stopping member 320 covers a portion of the opening O as well. In other words, the first stopping member 310 and the second stopping member 320 are respectively located above left and right sides of the buffering space O, thereby covering portions of the opening O of the buffering space G.

As shown in FIG. 4, a portion of the opening O is not covered by the first stopping member 310 and the second member 320. In other words, a portion of the opening O is exposed between the first stopping member 310 and the second stopping member 320, so that the second stopping member 320 can be spaced apart from the first stopping member 310 when the bracelet-type electronic apparatus is not bent. Therefore, when the bracelet-type electronic apparatus is bent, a gap is formed between the first stopping member 310 and the second stopping member 320, so as to allow the first stopping member 310 and the second stopping member 320 to approach each other, thereby facilitating to bend the elastic member 200.

When the user bends the bracelet-type electronic apparatus, the first stopping member 310 approaches the second stopping member 320 along the direction A3, and the second stopping member 320 approaches the first stopping member 310 along the direction A4. When the user bends the bracelet-type electronic apparatus, the first stopping member 310 and the second stopping member 320 are contacted with each other, thereby preventing the user from continuing bending the bracelet-type electronic apparatus, and thereby preventing damage to the main frame bodies 100 or the elastic member 200. In the embodiment shown in FIG. 4, the first stopping member 310 may extend from, but is not limited to extend from, the main frame body 100. As long as the first stopping member 310 and the second stopping member 320 can be in contact with each other when the bracelet-type electronic apparatus is bent, the first stopping member 310 can be disposed on other positions of the bracelet-type electronic apparatus, rather than extending from the main frame body 100. Similarly, in the embodiment shown in FIG. 4, the second stopping member 320 may extend from, but is not limited to extend from, the main frame body 100. As long as the first stopping member 310 and the second stopping member 320 can be in contact with each other when the bracelet-type electronic apparatus is bent, the second stopping member 320 can be disposed on other positions of the bracelet-type electronic apparatus, rather than extending from the main frame body 100.

In some embodiments, as shown in FIG. 4, the main frame bodies 100 and the elastic member 200 are integrally formed. In other words, the main frame bodies 100 and the elastic member 200 are not secured by additional securing mechanism, so as to lower the risk that the joint between the main frame body 100 and the elastic member 200 split.

In some embodiments, as shown in FIG. 4, the right main frame body 100 and the first stopping member 310 protruded thereon are integrally formed; similarly, the left main frame body 100 and the second stopping member 320 protruded thereon are integrally formed. In other words, the main frame bodies 100 and the first stopping member 310 and the second stopping member 320 are not secured by additional securing mechanism, so as to lower the risk that the joint between the right main frame body 100 and the first stopping member 310 split, and the risk that the joint between the left main frame body 100 and the second stopping member 320 split when the first stopping member 310 and the second stopping member 320 are in contact with each other.

In some embodiments, as shown in FIG. 4, the elastic member 200 has an inner side 201 and an outer side 202 opposite to each other. The inner side 201 is exposed in the buffering space G and is arc-shaped. The outer side 202 of the elastic member 200 is connected to the inner sides 101 of the adjacent main frame bodies 100. The first stopping member 310 has an inner side 311 exposing in the buffering space G. The second stopping member has an inner side 321 exposing in the buffering space G. One edge of the inner side 201 of the elastic member 200 is connected to the inner side 311 of the first stopping member 310, and another edge of the inner side 201 of the elastic member 200 is connected to the inner side 321 of the second stopping member 320. Therefore, the inner side 311 of the first stopping member 310 and the inner side 321 of the second stopping member 320 can both cover portions of the buffering space G.

Figure 5:
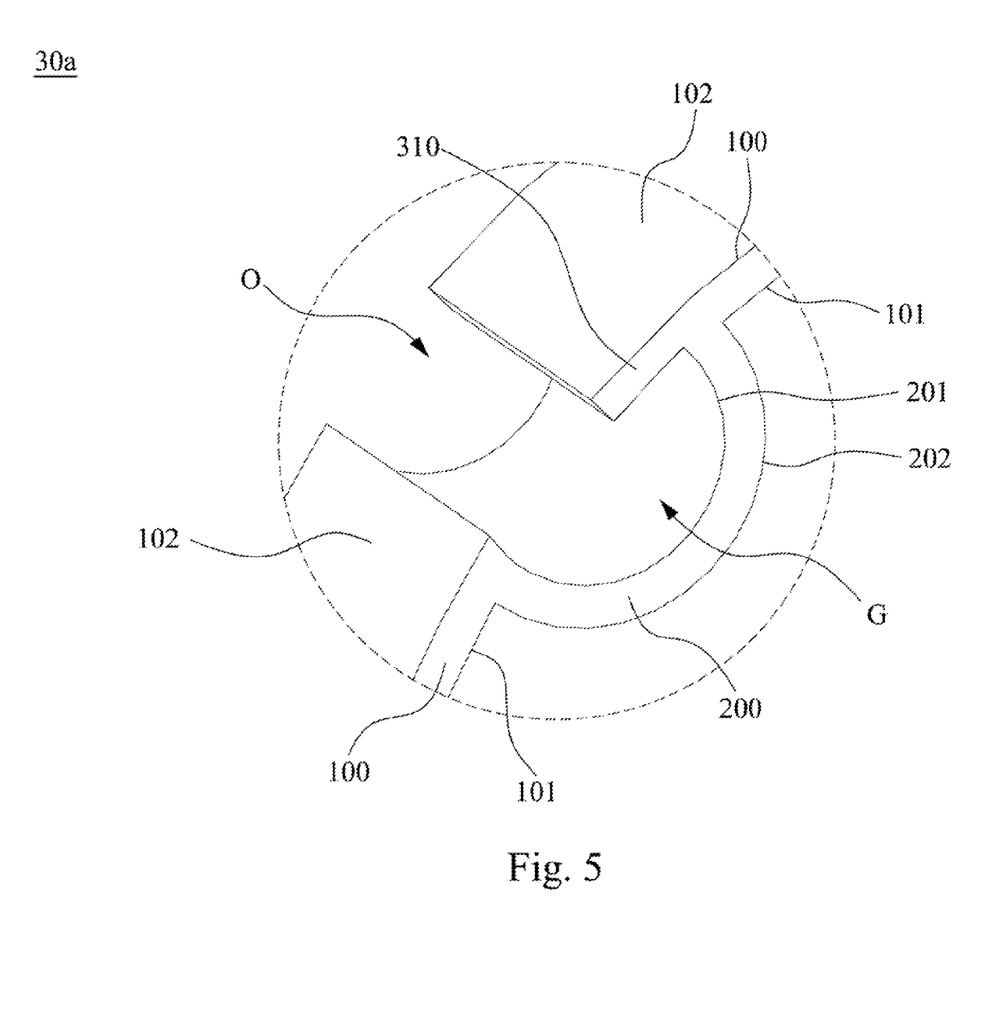
FIG. 5 is a fragmentary perspective view of a frame in accordance with another embodiment of the present invention.

FIG. 5 is a fragmentary perspective view of a frame 30a in accordance with another embodiment of the present invention. As shown in FIG. 5, the main difference between this embodiment and the foregoing embodiments is that: the frame 30a only has the first stopping member 310 and does not have the second stopping member 320 as shown in FIG. 4. In other words, one of the adjacent main frame bodies 110 (right main frame body 100) has the first stopping member 310 protruded thereon, and another of the adjacent main frame bodies 100 (left main frame body 100) does not have the second stopping member 320 thereon. In other words, in some embodiments, the buffering space G is only covered by one stopping member, not two stopping member.

Figure 6:
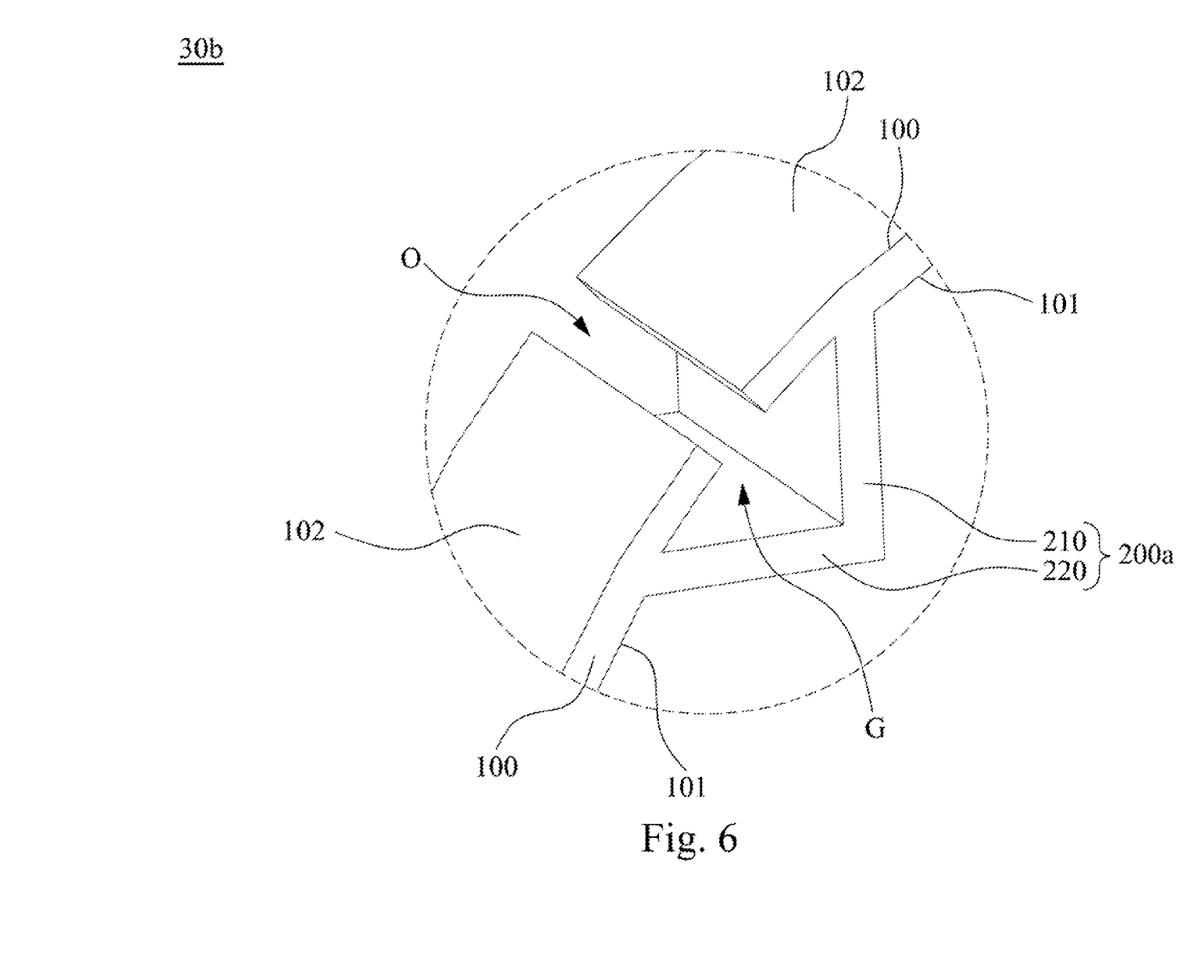
FIG. 6 is a fragmentary perspective view of a frame in accordance with another embodiment of the present invention.

FIG. 6 is a fragmentary perspective view of a frame 30b in accordance with another embodiment of the present invention. As shown in FIG. 6, the main difference between this embodiment and the foregoing embodiments is that: the shape of the elastic member 200a is different from the shape of the elastic member 200. In particular, the elastic member 200a is not formed in an arc shape, and instead, the elastic member 200a includes a first flat plate 210 and a second flat plate 220. The first flat plate 210 and the second flat plate 220 are connected to each other, and they define an included angle therebetween, so as to form the buffering space G. When the left main frame body 100 bears the bending force, this main frame body 100 deforms toward the opening O, which makes the second flat plate 220 bent toward the first flat plate 210. Similarly, when the right main frame body 100 bears the bending force, this main frame body 100 deforms toward the opening O, which makes the first flat plate 210 bent toward the second flat plate 220. As a result, the elastic member 200a bears the force exerting to the main frame bodies 100 located on opposite sides of the elastic member 200a, which prevents the main frame bodies 100 from bearing undue bending force, thereby preventing the frame 30b from splitting, or even broken.

Figure 7:
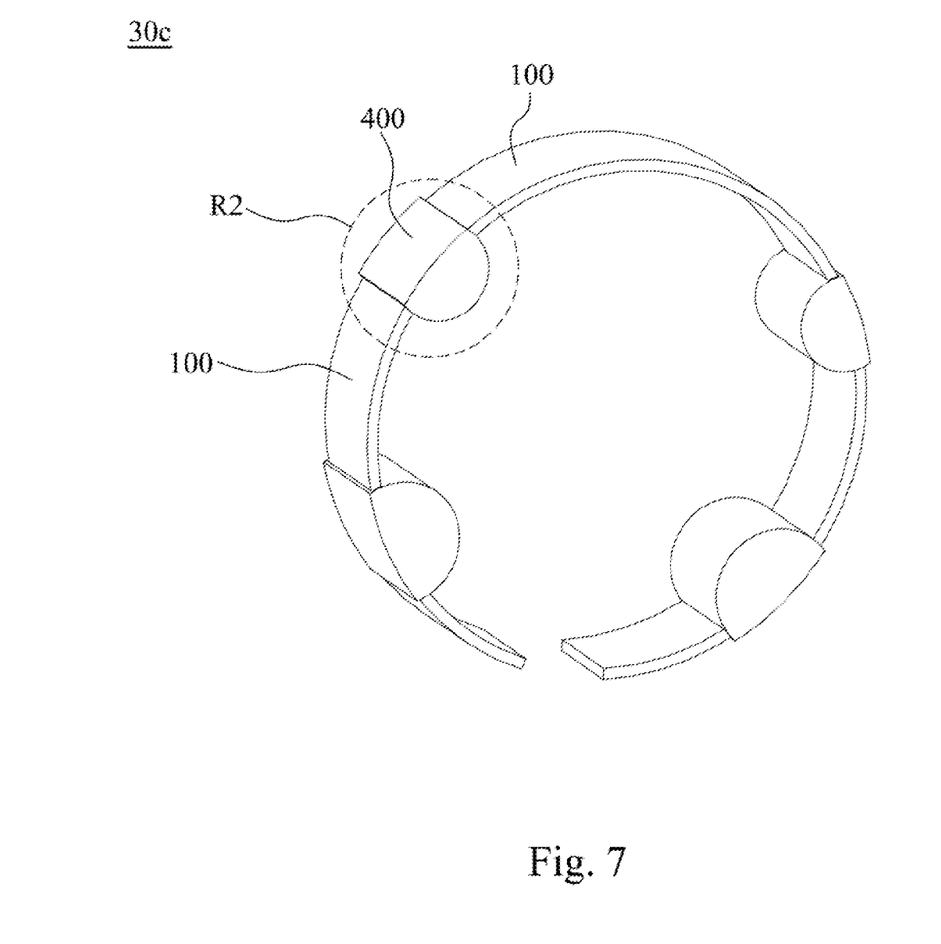
FIG. 7 is a perspective view of a frame in accordance with another embodiment of the present invention.
Figure 8:
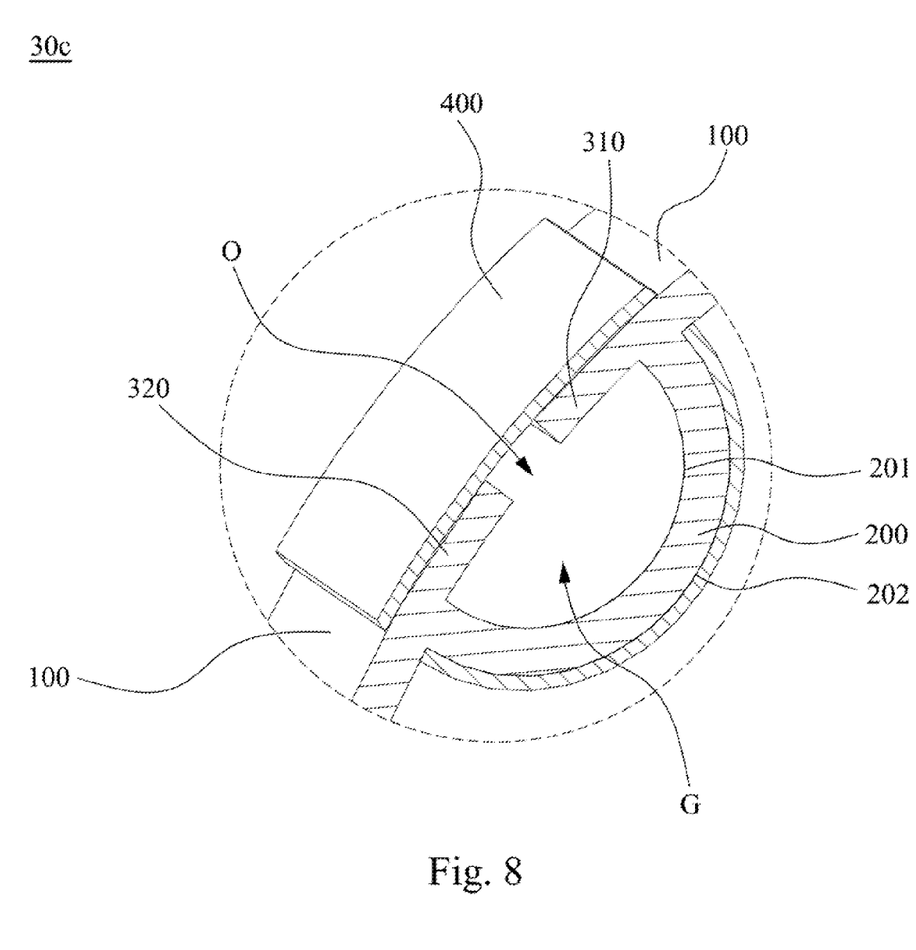
FIG. 8 is an enlarge view of the partial region R2 shown in FIG. 7.

FIG. 7 is a perspective view of a frame 30c in accordance with another embodiment of the present invention. FIG. 8 is an enlarge view of the partial region R2 shown in FIG. 7. As shown in FIGS. 7 and 8, the main difference between this embodiment and the foregoing embodiments is that: the frame 30c includes a sleeve 400. The sleeve 400 covers and is contacted with the elastic member 200. The sleeve 400 seals the buffering space G. Therefore, even if the manufacturer may utilize the plastic material to cover the frame 30c when manufacturing the bracelet-type electronic apparatus, the plastic material will not flow into the buffering space G and will not affect bending the elastic member 200. In other words, even if the manufacturer may utilize plastic material to cover the frame 30c, the buffering space G is kept hollow, so that when the frame 30c bears the bending force, the elastic member 200 can be bent to bear the force exerting the main frame bodies 100.

In particular, as shown in FIG. 8, the sleeve 400 can cover the elastic member 200, the first stopping member 310 and the second stopping member 320, and the sleeve 400 can also cover the portion of the opening O exposed between the first stopping member 310 and the second stopping member 320. Therefore, the sleeve can seal the buffering space G.

In some embodiments, the sleeve 400 is flexible, so that the sleeve 400 and the elastic member 200 can be bent together. In some embodiments, the sleeve 400 can be a heat-shrinkable sleeve that can shrink by heat, so as to tightly cover the elastic member 200, the first stopping member 310 and the second stopping member 320.

In some embodiments, as shown in FIG. 1, the display device 20 can be a touch display device, so as to allow the user to control the display device 20 in a touch manner. Moreover, in some embodiments, the bracelet-type electronic apparatus includes a wireless module to connect to Internet.

In the bracelet-type electronic apparatus provided in this context, because the frame includes the elastic member connected to two adjacent main frame bodies, the elastic member can be bent inwardly to bear the bending force exerting to the main frame bodies when the frame is bent outwardly, so that the force exerting to the lain frame bodies can be reduced, thereby preventing the frame from splitting or even broken.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame of a bracelet-type electronic apparatus, comprising; a plurality of main frame bodies forming an arc-shaped structure, two of the main frame bodies adjacent to each other defining an interval, the arc shaped structure defining a wearing space, each of the main frame bodies having an inner side facing the wearing space; at least one elastic member connected to two of the main frame bodies adjacent to each other, the elastic member protruded from the inner sides of the main frame bodies toward the wearing space; and at least one first stopping member protruded from one of the main frame bodies toward another of the main frame bodies adjacent to each other; wherein the elastic member is bodies adjacent to each other.

2. The frame of claim 1, wherein the main frame bodies and the elastic member are integrally formed as one piece.

3. The frame of claim 1, wherein the first stopping member and the main frame bodies are integrally formed as one piece.

4. The frame of claim 1, further comprising: a sleeve covering and contacted with the elastic member, the sleeve sealing the buffering space.

5. The frame of claim 4, wherein the sleeve is flexible.

6. The frame of claim 1, further comprising:
at least one second stopping member protruded from the another of the main frame bodies toward the main frame body from which the first stopping member is protruded, wherein the second stopping member is spaced apart from the first stopping member.

7. The frame of claim 1, wherein the elastic member is arc-shaped or polygonal.

8. A bracelet-type electronic apparatus, comprising: a flexible cover; a display device disposed on the flexible cover; and a frame accommodated in the flexible cover, the frame comprising: a plurality of main frame bodies forming an arc-shaped structure, two of the main frame bodies adjacent to each other defining an interval, the arc-shaped structure defining a wearing space; each of the main frame bodies having an inner side facing the wearing space; at least one elastic member connected to two of the main frame bodies adjacent to each other, the elastic member protruded from the inner sides of the main frame bodies toward the wearing space; and at least one first stopping member protruded from one of the main frame bodies toward another of the main frame bodies adjacent to each other; wherein the elastic member is formed in a curved shape and defines a buffering space, wherein one opening of the buffering space is located between two of the main frame bodies adjacent to each other.

9. The bracelet-type electronic apparatus of claim 8, wherein the main frame bodies and the elastic member are integrally formed.

10. The bracelet-type electronic apparatus of claim 8, wherein the first stopping member and the main frame bodies are integrally formed.

11. The bracelet-type electronic apparatus of claim 8, further comprising: a sleeve covering and contacted with the elastic member, the sleeve sealing the buffering space.

12. The bracelet-type electronic apparatus of claim 11, wherein the sleeve is flexible.

13. The bracelet-type electronic apparatus of claim 8, further comprising:
  at least one second stopping member protruded from the another of the main frame bodies to the main frame body from which the first stopping member is protruded, wherein the second stopping member is spaced apart from the first stopping member.

14. The bracelet-type electronic apparatus of claim 8, wherein the elastic member is arc-shaped or polygonal.

* * * * *